United States Patent [19]

Sievenpiper

[11] 3,854,499

[45] Dec. 17, 1974

[54] VALVE

[75] Inventor: Donald A. Sievenpiper, Kalamazoo, Mich.

[73] Assignee: General Signal Corporation, Rochester, N.Y.

[22] Filed: Mar. 26, 1973

[21] Appl. No.: 344,653

[52] U.S. Cl. ............................ 137/596.2, 251/339
[51] Int. Cl. ............................................ F16k 11/00
[58] Field of Search......... 137/596.7, 625.69, 614.2, 137/540, 596.13, 596.12; 251/339

[56] References Cited
UNITED STATES PATENTS

| | | | |
|---|---|---|---|
| 2,363,235 | 11/1944 | Ellinwood | 137/596.12 X |
| 2,710,594 | 6/1955 | Thompson | 251/339 X |
| 3,125,120 | 3/1964 | Hasbany | 137/596.2 X |
| 3,559,689 | 2/1971 | Dunbar | 137/596.2 X |

Primary Examiner—Martin P. Schwadron
Assistant Examiner—Robert J. Miller
Attorney, Agent, or Firm—Pollock, Philpitt & Vande Sande

[57] ABSTRACT

A check valve having excellent leak-resistant characteristics particularly when used with a hydraulic control valve. The check valve comprises a housing, a valve mechanism, and a valve seat. The housing comprises a fluid path defined by the walls of the housing and extending therethrough. The valve mechanism is located in the path. It includes a biasing means, such as a coil spring, a sealing means, and a means, such as a stem, for tilting the sealing means. Means are provided for maintaining the spring in proper position. The sealing means is free to move in a first direction of flow through the check valve against the bias of the spring. The valve seat is positioned against flow in the fluid path. The spring normally biases the sealing means into sealing engagement with the valve seat, but the stem may tilt the sealing means to allow fluid to flow in a second direction through the check valve. In one embodiment, the stem extends into a bore of a control valve as such so that when a spool of the control valve is moved to vent a port in which the check valve is located, a land of the spool contacts the stem, pushing it in a direction generally perpendicular to its axis, which tilts the sealing means to allow venting through the check valve.

12 Claims, 5 Drawing Figures

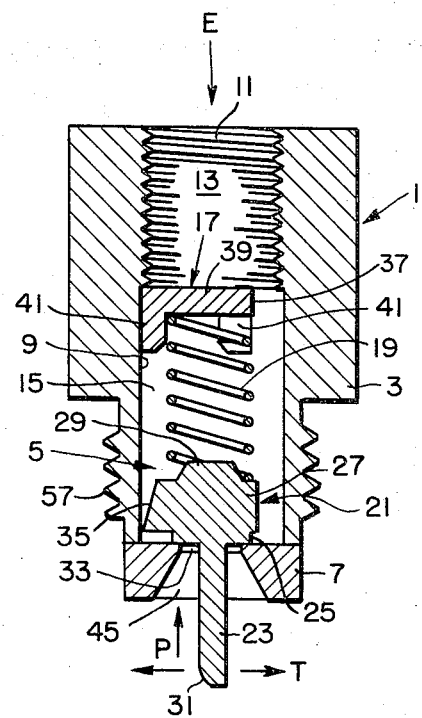
FIG. 1
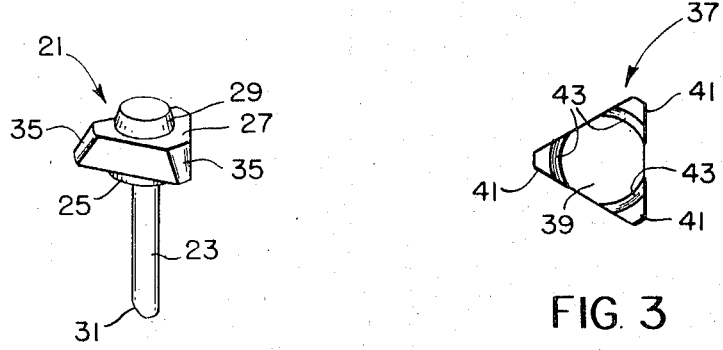
FIG. 2
FIG. 3

VALVE

BACKGROUND OF THE INVENTION

This invention relates to check valves. More particularly, this invention relates to a check valve uniquely useful in preventing leaks and drift in a hydraulic system.

Many functional devices, known throughout industry, require the use of a valve which allows fluid passage through it when desired, but which is also capable of retaining the fluid without leakage once the desired operation has been effected. There is perhaps no better example of such a need than in the hydraulics industry. Many pieces of equipment, for example stabilizer assemblies, diggers, plows, man-lifts, and the like, require some mechanism as an integral part of their hydraulic control assembly to eliminate any amount of drift over long periods of time. That is to say, once an operation has been hydraulically effected (for example, the pressurization of a motor part to raise or lower a work piece) and it is desired to maintain the position which that operation achieved, it is often necessary to employ a check valve mechanism so as to prevent leakage of fluid and thus prevent a gradual return of the system to its previous position.

A wide variety of check valves have been designed for use in hydraulic systems in an attempt to reduce drift by eliminating or at least mitigating the leakage problem. Such check valves are usually employed in combination with the control valve(s) of the hydraulic system regardless of the number of positions which the control valve may achieve (i.e., three, four, or five). For example, it is well known to employ pilot-operated check valves in a four-position valve system wherein the oil supplied from one cylinder port is used to operate a piston that in turn opens the check valve allowing oil to return through the opposite cylinder port.

Such pilot-operated check valves, while often exhibiting good anti-leak characteristics, are often quite expensive and complex and are not always adaptable for use with three-position valves. In view of this, the art has made numerous attempts to design a less costly and more simplified check valve which is adaptable for use with a wide variety of control valves and which at the same time, exhibits good anti-leak characteristics. Such valve designs have generally included a plate or ball member, spring-biased against a retaining seat into sealing engagement therewith, and a stem member extending downwardly from the sealing plate or ball so as to reside against a groove between opposing lands in the control valve spool. On the groove there is usually provided a cam (horizontally sloping surface) which, when the spool is moved, causes the stem to vertically lift and thus effect a lifting of the plate member in the vertical direction from its retaining seat to allow fluid to pass through the valve.

While these "simplified" prior art designs are generally operative they have many problems attendant with them. For example, in order to obtain the necessary lifting action, both the cam and the valve dimensions must be exceedingly precise. Such a problem seriously effects the economy of the system. On the other hand, compromises for economy sake on such dimensional preciseness cause a significant increase in the effort needed to operate the spool in order to release the check (lift it from its sealing engagement with its retaining seat).

While several attempts have been made to overcome these problems, such as by way of providing a two-staged cam rather than a single sloping cam, such efforts have generally failed in that in almost every instance they have been unsuccessful in eliminating the need for extreme precision, or when sacrificing precision, then incuring difficulty in operating the valve and/or allowing only a generally unacceptable amount of leakage therethrough.

In view of the above, it is evident that there exists a need in the art for a check valve useful in all types of hydraulic and other systems which overcomes the dimensional precision requirement of the above-described valves, allows the valve to be easily operated, and yet is effective in its anti-leak characteristics.

SUMMARY OF THE INVENTION

It is a purpose of this invention to fulfill the above-described needs in the art, as well as other needs which will become more apparent to the skilled artisan once given the following disclosure.

This invention generally fulfills the above-described needs by providing a unique valve particularly useful as a check valve in hydraulic systems which include at least one control valve housing a reciprocatable spool mechanism. The valves of this invention achieve at least a portion of their uniqueness by not (as does the above-described prior art) employing as its primary releasing or unseating action, a longitudinal lifting movement of the valve stem mechanism. Rather, the valves of this invention employ a "tilting" effect which is more easily achieved and eliminates the need for precise dimensioning.

Such valves contemplated by this invention generally include a housing, a valve mechanism, and a valve seat. The housing includes walls which define a flow-through path. The valve mechanism is located in this path and is comprised of a spring means, a sealing means, and a means for tilting the sealing means. The tilting means may be a stem that is connected to the sealing means and extends through an orifice in the valve seat. The valve seat is positioned against flow in the housing path such that flow must pass through the orifice of the valve seat. The spring means normally biases the sealing means into sealing engagement with the valve seat, but the seal means is free to move in the direction of flow through the valve against the bias of the spring. The stem extends through the valve seat orifice from the sealing means and is capable of being moved to impart a tilt to the sealing means from its normal sealing engagement, thereby allowing fluid to flow through the housing path.

For most of the valves contemplated by this invention, this "tilt" action impartable to the sealing means by movement of the stem is brought about by moving the end of the stem opposite that which is connected to the sealing means, in a direction generally perpendicular to the axis of the stem. This usually results in the sealing means being maintained in partial engagement with the valve seat while a portion thereof disengages itself from the valve seat to break the seal and allow fluid to flow through the path of the housing and through the orifice of the valve seat. In this respect, of course, it is understood that the stem is of a dimension smaller than that of the orifice in the valve seat so as to allow fluid to flow therethrough.

This invention also contemplates a combination of the above-described check valve with a hydraulic system such that there is provided in this hydraulic system a control valve including a core member having a bore which slideably retains a spool means therein through or about which hydraulic fluid is capable of controlled flow by reciprocation of the spool in the bore, a fluid input port, tank port, and work port, each of said ports being in the walls of said bore and communicating with said spool. The check valve of the present invention is preferably located within the work port. The improvement in such a system, of course, comprises the check valve as abovedescribed such that the stem extends into the bore and is capable of being moved by said spool means as it is reciprocated in the bore so as to impart the necessary tilting action to the sealing means at the prescribed time during the controlled flow operation of the spool.

This invention will now be described with reference to certain embodiments thereof presented by way of illustration rather than limitation and wherein:

IN THE DRAWINGS

FIG. 1 is a side sectional view of a valve as contemplated by this invention;

FIG. 2 is a perspective view of an embodiment of the sealing means and stem means as contemplated by this invention;

FIG. 3 is a end view of a spring retaining means;

DETAILED DESCRIPTION

Figure 4:
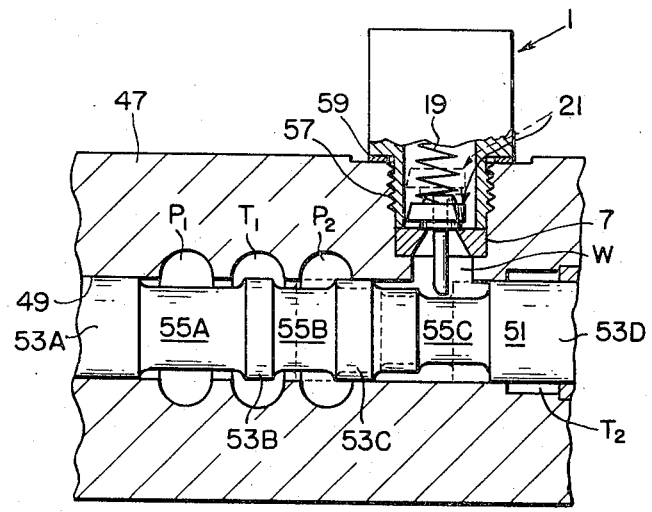
FIG. 4 is a cut-away, partially sectionalized view of the valve means of FIGS. 1-3 employed in a hydraulic system.

Referring now to FIGS. 1—3, a check valve generally designated as 1 comprises a housing member 3, a valve mechanism generally indicated as 5, and a valve seat 7.

The walls 9 of housing member 3 define a flow-through path 11, which in this embodiment, comprises an orifice 13 of relatively small diameter and an orifice (or more appropriately described, a valve mechanism retaining chamber) 15 of relatively larger diameter. Orifice 13 communicates with valve mechanism retaining chamber 15 such that within housing 3 there are provided lateral walls 17 which are useful, as described hereinafter, for retaining in the upper end of valve 1 the valve mechanism of this invention.

Valve mechanism 5 generally comprises a biasing means which is preferably a coil spring 19 which, in a known conventional fashion, will be calibrated to provide the necessary biasing force to achieve the desired effects of this invention. Valve mechanism 5 in addition, comprises a sealing means 21 and a means for tilting the sealing means, such as stem means 23.

Sealing means 21 may be formed of any material capable of being machined or otherwise formed so as to be compatible (i.e., capable of easily being brought into sealing engagement) with the upper surface of valve seat 7. In the preferred embodiments of this invention, sealing means 21 includes a seat member 25, a guide plate 27, and a coil spring centering means 29.

As best illustrated in FIG. 2, stem means 23 is a longitudinally extending circular body with a slightly bevelled lower end 31 and a significantly smaller diameter than orifice 33 located in valve seat 7. Seat member 25 is generally circular in nature and of a larger diameter than orifice 33. As described above, the lower surface of seat member 25 is usually of a polished metal or other material so as to be sealingly compatible (i.e., easily biased by spring 19 against the valve seat 7) thereby to prevent substantially any amount of leakage through valve 1.

Guide plate 27, as illustrated is generally triangular in nature, having an upper surface of smaller dimensions than the lower surface and having bevelled apices 35. As illustrated, the lower surfaces of apices 35 generally communicate in sliding fashion with walls 9 so as to provide the necessary guiding mechanism for locating seat member 25 substantially directly above orifice 33. On the other hand, apices 35 allow the sealing means 21 to be tilted from its illustrated horizontal position without hindrance when the lower end of stem 23 is moved in a substantially horizontal fashion (in the direction of arrow T).

As illustrated, coil spring centering means 29 maintains the centering of spring 19 despite the tilting action which takes place when stem 23 is moved as described. As illustrated, means 29 may assume a simple conical shape, although other shapes and designs may be equally as effective for retaining coil spring 19 in its centered position.

Coil spring 19 could be retained in its biasing position by merely allowing the upper coil to reside directly in contact with lateral wall 17. However, a tendency to slide laterally from its centered position is likely to occur in such an embodiment, and thus it is preferred for the purposes of this invention to provide spring retaining and centering means generally illustrated at 37. Spring retaining and centering means 37 is best illustrated in FIG. 3. Referring then to this figure, it can be seen that means 37 is generally triangular in nature. Means 37, in addition, is comprised of a base plate 39 and upwardly extending spring retaining portions 41. As illustrated, retaining portions 41 are formed with an internally curved surface 43 such that coil spring 19 is easily assembled therebetween, but curves 43 define a circle only slightly larger in diameter than the diameter of coil spring 19, thus centering and retaining the spring in a constant position for its most effective biasing use.

In operation, it can be seen, that when pressurized fluid exists above sealing means 21, and/or pressurized fluid less than the pressure of the biasing spring 19 exists below sealing means 21, substantially no leakage occurs through orifice 33. This is true despite the fact that the design employed is simple and easily and economically made without the need for precise location and dimensioning of the parts. On the other hand, fluid is readily exhausted through this valve in the direction of arrow E, merely by moving stem 33 in the direction of the arrows T thus to cause a tilting effect which, while maintaining seat member 25 in partial engagement with the upper surface of valve seat 7, tilts a portion of seat 25 out of engagement with retaining seat 7, and because of the triangular nature of both guide plate 27, base plate 39, and the circular nature of chamber 15, together with the slight tilting imparted to plate 27, allow for easy and rapid exhaust of fluid through orifice 33.

Flow in the opposite direction is also easily effected in valve 1. For example, in order to effect a flow of fluid in the direction of arrow P, one need only overcome the biasing force of coil spring 19 on sealing means 21 to effect a substantial vertical lifting of sealing means 21. This allows easy flow through path 11 due to the triangular nature of plates 27 and 39. It is of course also recognized that once the pressure in the direction of arrow P is terminated, or otherwise equalized above and below seal means 21 after such flow, the bias of coil spring 19 will return seal means 21 to its sealing engagement with valve seat 7.

Valve seat 7 has been illustrated in its preferred form in which there is provided a relatively large orifice 45 and a relatively small orifice 33, and in which valve seat 7 is a part, separate from housing 1. On the other hand, this invention also contemplates the employment of any type of valve seat such as for example, where seat 7 is an integral part of housing 1 and/or where there is merely one orifice extending through seat 7.

As indicated hereinabove, this invention, because of its unique economy and design, makes it extremely effective for use as a check valve in a hydraulic system. A typical example of how this valve may be employed as a check valve in a hydraulic system is best exemplified by reference to FIGS. 4 and 5. In these figures, there is illustrated a conventional open center, three-position hydraulic control valve comprised of a valve housing or core 47 having located therein a conventional housing bore 49 which retains a reciprocatable control valve spool 51. Spool 51 is defined by a series of lands 53 A–D and grooves 55 A–C.

Defined within the walls of bore 49 are input ports (from pump) P1 and P2. Also located therein are tank or sump ports (venting fluid to tank or sump) T1 and T2. Further located within the walls of bore 49 and interpositioned between ports P2 and T2 is work or motor port W which is connected via the orifice in check valve 1 (as shown in FIG. 1) to a conventional hydraulic motor (not shown).

Check valve 1 is retained within housing 47 by screw thread means 57. As check valve 1 is screwed in housing 47, coil spring 19 is biased against sealing means 21 to hold valve seat 7 firmly within housing 47 as illustrated. In addition, a metal washer 59 may be employed for better sealing the upper portion of check valve 1 on outer housing 47.

Such an arrangement is uniquely suited for use in devices in which drift may be a problem or is undesirable. In this respect, the valves of this invention have been found capable of mitigating the drift problem in large systems and substantially eliminating it in systems employing less than about 20 g.p.m. as a flow through rate. That is to say, in most instances the check valves of this invention are capable of maintaining leakage at less than is normally acceptable, such as less than about 20 cc/min. at about 1,100 psi, and in those systems of relatively low flow rates (e.g., about 20 g.p.m.), leakage is maintained at a value considerably below 20 cc/min. Such a valve, then, is uniquely applicable in hydraulic systems for stabilizing feet on backhoe devices in garden tractors and on snow plows.

The full line presentation in FIG. 4 illustrates the control valve in its hold position either before or after the motor port W (and thus the motor) has been pressurized. As can be seen, and for example in start up, ports P1 and P2 are connected to tank via port T1 while lands 53C and 53D isolate work port W from tank. If, in start up, it is desired to pressurize work port W (and thus the work motor via check valve 1) spool 51 is moved by the operator (not shown) to the left to a position as indicated by the dotted lines. As can be seen from this dotted line portion, pressure port P2 is brought into flow communication with work port W while lands 53C and 53D isolate W from tank ports T1 and T2 respectively. This enables pressure to flow through port W, orifice 45, and 33, and raise sealing means 21 (against the bias of the spring) in accordance with the dotted line portion to allow pressure flow through check valve 1. Then, in accordance with conventional spring biasing techniques at one end or the other of spool 51, the operator may wish to terminate operation (i.e., flow to work port W) and thus return spool 51 to its full line position. As this is done, pressure is equalized above and below sealing means 21 and thus sealing means 21 (including its spring end) return due to the bias of the spring to its full line position in sealing engagement with valve seat 7. Such an operation would occur for example during the start up of a snow plow operation wherein in order to get to the road to be plowed the operator raised the plow off of the ground and wishes it held there until the destination for plowing is reached.

It should be noted in regard to the operation illustrated in FIG. 4 that in pressurizing work port W, land 53D is not moved so far to the left as to intercept or tilt sealing means 21. While this could be effected if desired, it is preferred for the purposes of long life of the valve, that this not take place since it is needless and therefore would merely serve to wear out the valve faster than if such an operation were not effected.

Figure 5:
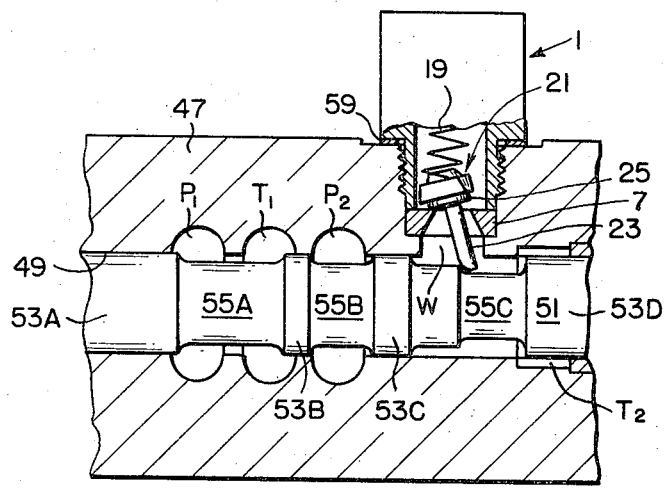
FIG. 5 is the same system as FIG. 4 but in a different mode of operation.

Referring now to the operation illustrated in FIG. 5, assume that it is desirous of exhausting the pressure which has been built up in the motor via work port W. Such an operation, would occur, for example, when the operator of the snow plow has reached his destination and now wishes to plow the road by lowering the snow plow into contact with the road surface. In order to effect such an operation, spool 51 is moved to the right such that land 35C isolates port W from pump port P2 while groove 55C communicates port W with tank T2. In so effecting this operation, the forward end of land 53C contacts the lower portion of stem 23 and moves it in a generally horizontal direction (e.g., somewhat circular but generally perpendicular to flow through orifice 33). This causes seat 25 to tilt on valve seat 7 thus to effect an exhaust of the pressurized fluid through path 11, work port W, the conduit defined by the bore and groove 55C, and out through port T2.

In addition, and as a unique feature of this invention, lands 53A and 53B are so designed so that during this operation pump port P1 is in flow communication with tank port T1. Thus, pump pressure does not build up behind the spool making the valve easier to operate and conserving energy by preventing heat build up and the like.

When it is no longer desired to exhaust, spool 51 is returned to its hold position (the full line position as illustrated in FIG. 4). The biasing force of coil spring 19 being held in its centrist position via the mechanisms hereinabove described, then returns sealing means 21 into sealing engagement with valve seat 7, from which position the operation as hereinabove described may be restarted.

As discussed above, this invention has been found uniquely applicable in hydraulic systems art and particularly when employing the smaller valves (flow-throughs of about 20 g.p.m. or less) as hereinabove described. Once given the above disclosure many other features, modifications, and improvements will become apparent to the skilled artisan. Thus, such other features, modifications and improvements are considered to be a part of this invention, the scope of which is to be determined by the following claims.

What is claimed is:

1. In a hydraulic system comprising a control valve including a core member having a bore which slidably retains a spool means through or about which hydraulic fluid is capable of controlled flow by reciprocation of the spool in the bore, at least one fluid input port, tank port, and work port, said ports being in the walls of said bore and communicating with said spool, and a check valve located within said work port, said check valve comprising a housing member, a valve mechanism, and a valve seat, said housing member comprising walls which define a fluid path, said valve mechanism being located in said path, said valve mechanism comprising a spring means, a spring retaining member, a sealing means, and a stem means for tilting said sealing means, said sealing means being free to move in a first direction of flow through said valve against the bias of said spring means, said valve seat being positioned against flow in said housing member path, and said spring means normally biasing said sealing means into sealing engagement with said valve seat, said housing member path comprising a relatively large valve mechanism retaining chamber and a relatively smaller orifice, said spring retaining member being located at the point of communication of said retaining chamber and said smaller orifice, said spring means being a coil spring, one end of which contacts said spring retaining member while the other end contacts said sealing means, said sealing means comprising a seat member, a guide means, and a coil spring centering means, said seat member being of a diameter larger than said valve seat orifice, said guide means being of a diameter only slightly less than the diameter of said chamber and said coil spring centering means being of a diameter only slightly less than the inner diameter of said coil spring, said guide means comprising a guide plate of a crossectional shape different from that of said retaining chamber, said other end of said coil spring contacting the guide plate said seat member being located on said guide plate and in flow intercepting communication with said valve seat orifice, and said spring centering means being located on said guide plate and extending into the cone defined by said coil spring a distance sufficient to retain said spring in its centrist position when said sealing means is tilted, said spool including at least one groove located in flow communication with said work port, and at least one land adjacent said groove, said stem means extending through an orifice in said valve seat a sufficient distance such that when said spool is reciprocated so as to isolate said work port from said input port and bring said groove into flow communication with said tank port, said land moves said stem in a direction substantially perpendicular to flow through the check valve thereby tilting said sealing means so as to place said check valve in flow communication with said tank port.

2. The improvement of claim 1 wherein said control valve is so constructed that when said sealing means is in a tilted position, said input port is in flow communication with a tank port.

3. The improvement of claim 1 wherein said control valve has a fluid flow through rate of less than about 20 gallons per minute.

4. The improvement of claim 3 wherein leakage through said check valve is less than about 20 cc/min. at a pressure of 1,100 psi.

5. The improvement of claim 4 wherein said control valve is a three-position control valve.

6. The improvement of claim 5 wherein said check valve is in flow communication with an actuating motor.

7. In a hydraulic system comprising a control valve including a core member having a bore which slidably retains a spool means through or about which hydraulic fluid is capable of controlled flow by reciprocation of the spool in the bore, at least one fluid input port, tank port, and work port, said ports being in the walls of said bore and communicating with said spool, and a check valve located within said work port, said check valve comprising a housing member, a valve mechanism, and a valve seat, an opening formed by walls of said housing member to define a fluid path, said valve mechanism being located in said path, said valve mechanism comprising a biasing means, a sealing means, and a stem means for tilting said sealing means, said biasing means normally biasing said sealing means into sealing engagement with said valve seat with said sealing means being free to move in a first direction of flow through said valve against the bias of said biasing means and said stem means being capable of being moved to impart a tilt to said sealing means from its normal sealing engagement to allow fluid to flow in a second direction through said valve, said sealing means including a guide member spaced from said seat, said guide member being of a cross-sectional shape that is different than the shape of the opening, said guide member engaging said walls to provide a more positive tilting action when said stem means tilts said sealing means.

8. The hydraulic system of claim 7, wherein said guide member is generally triangular.

9. The hydraulic system of claim 8, wherein said guide member has an upper surface of smaller dimensions than its lower surface with the apices of the triangular being bevelled.

10. The hydraulic system of claim 9, wherein said spool means comprises at least one land, said stem means being positioned so as to be contactable by said land when said spool means is given its prescribed movement.

11. The hydraulic system of claim 10, wherein said tilting actions allows fluid to be exhausted from the check valve to tank via the control valve.

12. The hydraulic system of claim 11, wherein flow from the control valve through the check valve is effected by causing the pressure in the work port to exceed that of the biasing force of said spring means, thus lifting the sealing means from its sealing engagement in a direction substantially parallel with flow through said check valve.

* * * * *